United States Patent [19]
Deutsch et al.

[11] Patent Number: 5,915,773
[45] Date of Patent: Jun. 29, 1999

[54] SLIDING AND PIVOTING RETRACTABLE LOADER

[76] Inventors: Gerard A. Deutsch; Cheryl L. Deutsch, both of 540 Seip Ave., Nazareth, Pa. 18064

[21] Appl. No.: 09/018,991

[22] Filed: Feb. 5, 1998

[51] Int. Cl.$^6$ ..................................................... B60P 1/00
[52] U.S. Cl. ........................ 296/26.1; 414/522; 414/537
[58] Field of Search ........................... 296/26.01, 26.08, 296/26.09, 26.1; 414/522, 537

[56] References Cited

U.S. PATENT DOCUMENTS

| 4,078,678 | 3/1978 | Tordella | 414/537 |
| 4,305,695 | 12/1981 | Zachrich | 414/522 |
| 4,950,123 | 8/1990 | Brockhaus | 296/37.1 |
| 4,993,088 | 2/1991 | Chudik | 414/522 |

FOREIGN PATENT DOCUMENTS

| 2579146 | 9/1986 | France | 414/522 |

*Primary Examiner*—Dennis H. Pedder

[57] ABSTRACT

A loader system is provided including a plate for supporting cargo directly thereon within a bed of a truck. Also included is a mechanism for allowing the plate to slide rearwardly in coplanar relationship with the bed of the truck and further allowing the plate to pivot about a horizontal axis.

9 Claims, 5 Drawing Sheets

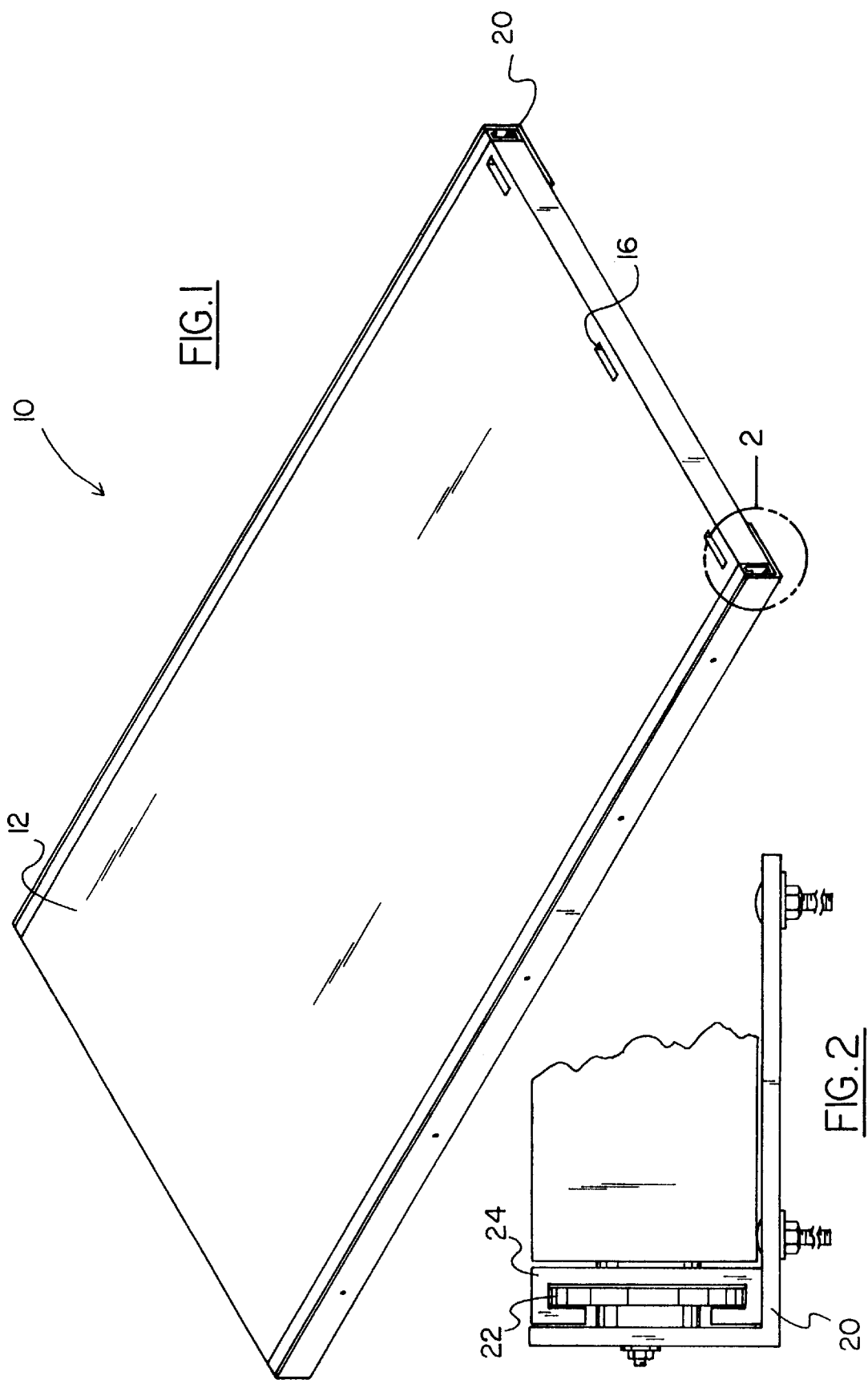

SLIDING AND PIVOTING RETRACTABLE LOADER

BACKGROUND OF THE INVENTION

1. Field of the Invention

The present invention relates to loaders and more particularly pertains to a new sliding and pivoting retractable loader for facilitating the removal of cargo from a bed of a truck.

2. Description of the Prior Art

The use of loaders is known in the prior art. More specifically, loaders heretofore devised and utilized are known to consist basically of familiar, expected and obvious structural configurations, notwithstanding the myriad of designs encompassed by the crowded prior art which have been developed for the fulfillment of countless objectives and requirements.

Known prior art loaders include U.S. Pat. No. 5,331,701; U.S. Pat. No. 5,257,894; U.S. Pat. No. 5,160,236; U.S. Pat. No. 4,685,857; U.S. Pat. Des. No. 357,789; and U.S. Pat. No. 5,244,335.

In these respects, the sliding and pivoting retractable loader according to the present invention substantially departs from the conventional concepts and designs of the prior art, and in so doing provides an apparatus primarily developed for the purpose of facilitating the removal of cargo from a bed of a truck.

SUMMARY OF THE INVENTION

In view of the foregoing disadvantages inherent in the known types of loaders now present in the prior art, the present invention provides a new sliding and pivoting retractable loader construction wherein the same can be utilized for facilitating the removal of cargo from a bed of a truck.

The general purpose of the present invention, which will be described subsequently in greater detail, is to provide a new sliding and pivoting retractable loader apparatus and method which has many of the advantages of the loaders mentioned heretofore and many novel features that result in a new sliding and pivoting retractable loader which is not anticipated, rendered obvious, suggested, or even implied by any of the prior art loaders, either alone or in any combination thereof.

To attain this, the present invention generally comprises a plate having a planar rectangular configuration with a top face, a bottom face and a periphery formed therebetween. The periphery is defined by a pair of parallel elongated side faces and a pair of parallel short end faces. As an option, the top face has a matrix of rectangular recesses formed therein adjacent to a rear one of the end faces of the periphery for containing various items therein. Note FIG. 7. The plate further includes a plurality of thin rectangular slits formed therein. Such slits reside in linear alignment along the rear one of the end faces for gripping purposes. As shown in FIG. 3, the side faces each have an elongated slot formed in a central extent thereof. Also included is a pair of elongated brackets each having a length equal to that of a truck bed and an L-shaped cross-section along the entire length thereof. The brackets each include a horizontal extent coupled to a corresponding side edge of the truck bed. As shown in FIG. 3, a vertical extent of each bracket is equipped with a plurality of spaced rollers mounted along an inner surface thereof. Next provided is a pair of sleeves each having a length equal to that of the brackets and a rectangular cross-section along their entire length. Each sleeve has an inner face, an outer face, a top face and a bottom face interconnected to define a pair of open ends. The inner face of each sleeve has a roller mounted to a central extent thereof. The outer face of each sleeve has an elongated slot formed along an entire length thereof. Such slot serves for slidably receiving the rollers of an associated one of the brackets. As such, each sleeve slides in constant parallel relationship with the associated bracket. In use, the roller of the inner face of each sleeve is slidably situated within the corresponding slot of the plate such that the plate may be slid forwards and rearwards in coplanar relationship with the truck bed. In addition, the plate may further pivoted about an axis defined by the rollers of the sleeves when extended to its full rearward orientation thereby affording a ramp. Finally, a plurality of extendible legs are mounted within recesses formed in the bottom face of the plate for pivoting between a retracted orientation and a deployed orientation. In the retracted orientation, the legs each remain in the associated recess. In the deployed orientation, the legs each reside perpendicular with the plate for supporting the same in a horizontal plane when extended to its full rearward orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new sliding and pivoting retractable loader apparatus and method which has many of the advantages of the loaders mentioned heretofore and many novel features that result in a new sliding and pivoting retractable loader which is not anticipated, rendered obvious, suggested, or even implied by any of the prior art loaders, either alone or in any combination thereof.

It is another object of the present invention to provide a new sliding and pivoting retractable loader which may be easily and efficiently manufactured and marketed.

It is a further object of the present invention to provide a new sliding and pivoting retractable loader which is of a durable and reliable construction.

An even further object of the present invention is to provide a new sliding and pivoting retractable loader which is susceptible of a low cost of manufacture with regard to both materials and labor, and which accordingly is then susceptible of low prices of sale to the consuming public, thereby making such sliding and pivoting retractable loader economically available to the buying public.

Still yet another object of the present invention is to provide a new sliding and pivoting retractable loader which provides in the apparatuses and methods of the prior art some of the advantages thereof, while simultaneously overcoming some of the disadvantages normally associated therewith.

Still another object of the present invention is to provide a new sliding and pivoting retractable loader for facilitating the removal of cargo from a bed of a truck.

Even still another object of the present invention is to provide a new sliding and pivoting retractable loader that includes a plate for supporting cargo directly thereon within a bed of a truck. Also included is a mechanism for allowing the plate to slide rearwardly in coplanar relationship with the bed of the truck and further allowing the plate to pivot about a horizontal axis.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new sliding and pivoting retractable loader according to the present invention.

FIG. 2 is a detailed end view of the present invention showing the bracket, rollers and sleeve.

DESCRIPTION OF THE PREFERRED EMBODIMENT

Figure 3:
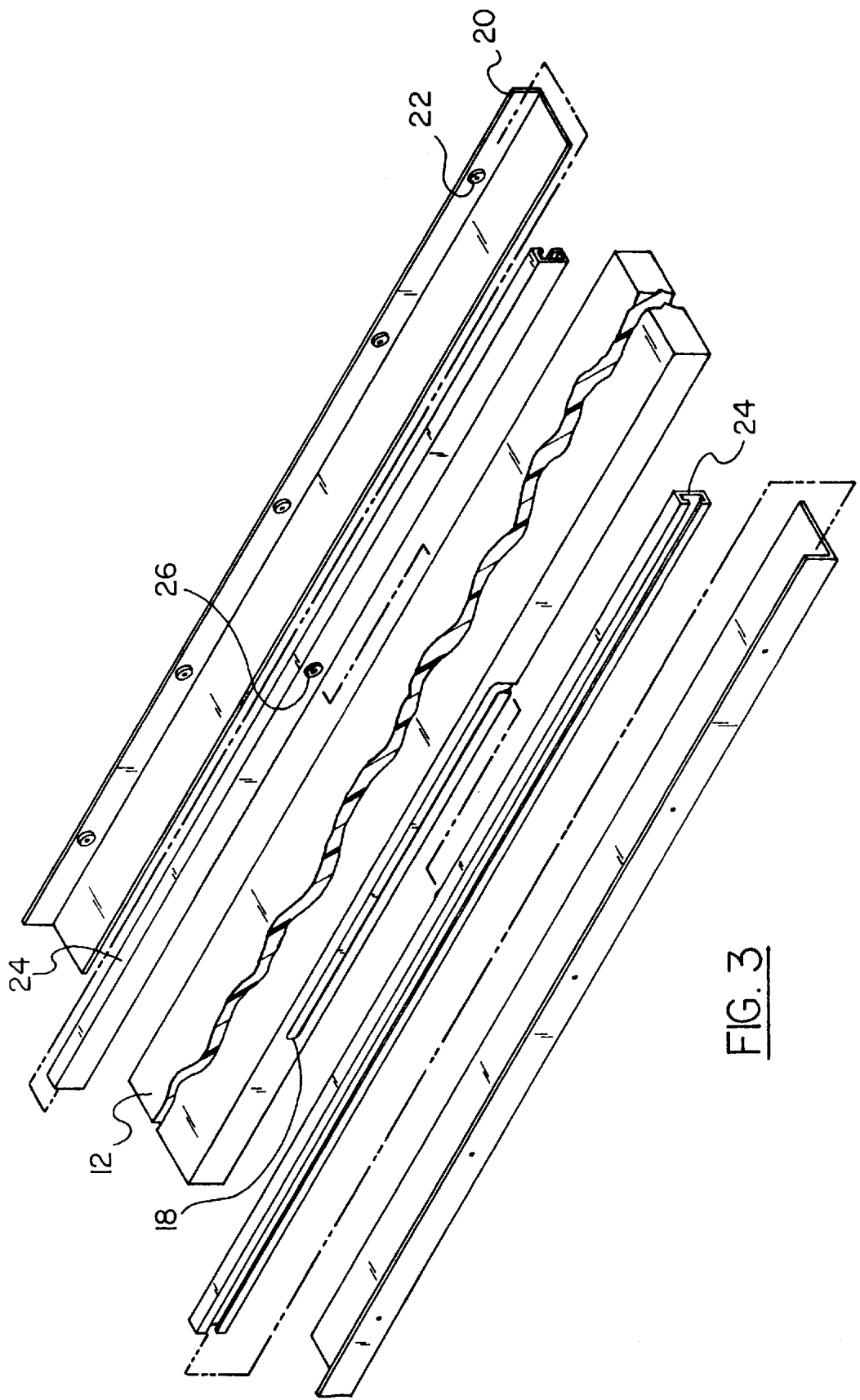
FIG. 3 is a perspective view of the present invention.

With reference now to the drawings, and in particular to FIGS. 1 through 10 thereof, a new sliding and pivoting retractable loader embodying the principles and concepts of the present invention and generally designated by the reference numeral 10 will be described.

The present invention, designated as numeral 10, includes a plate 12 having a planar rectangular configuration with a top face, a bottom face and a periphery formed therebetween. The periphery is defined by a pair of parallel elongated side faces and a pair of parallel short end faces. As an option, the top face has a matrix of rectangular recesses 14 formed therein adjacent to a rear one of the end faces of the periphery for containing various items therein. Note FIG. 7.

The plate further includes a plurality of thin spaced rectangular slits 16 formed therein. Such slits reside in linear alignment along the rear one of the end faces for gripping purposes. As shown in FIG. 3, the side faces each have an elongated slot 18 formed in a central extent thereof. For reasons that will become apparent hereinafter, the length of the slot extends only about ⅓ a length of plate. Further, a front edge of the slot is in communication with the bottom face of the slot.

Also included is a pair of elongated brackets 20 each having a length equal to that of a truck bed and an L-shaped cross-section along the entire length thereof. The brackets each include a horizontal extent coupled to a corresponding side edge of the truck bed. As shown in FIG. 3, a vertical extent of each bracket is equipped with a plurality of spaced rollers 22 mounted along an inner surface thereof.

Next provided is a pair of sleeves 24 each having a length equal to that of the brackets and a rectangular cross-section along their entire length. Each sleeve has an inner face, an outer face, a top face and a bottom face interconnected to define a pair of open ends. The inner face of each sleeve has a roller 26 mounted to a central extent thereof. The outer face of each sleeve has an elongated slot formed along its entire length. Such slot serves for slidably receiving the rollers of an associated one of the brackets. As such, each sleeve slides in constant parallel relationship with the associated bracket.

In use, the roller of the inner face of each sleeve is slidably situated within the corresponding slot of the plate such that the plate may be slid forwards and rearwards in coplanar relationship with the truck bed. It should be noted that lips associated with the slot of each plate prevent the removal of the corresponding roller with the exception of the opening at the front end thereof. The forgoing structure further permits the plate to be pivoted about an axis defined by the rollers of the sleeves when extended to its full rearward orientation thereby affording a ramp.

Finally, a plurality of extendible telescoping legs 28 are mounted within recesses formed in the bottom face of the plate for pivoting between a retracted orientation and a deployed orientation. In the retracted orientation, the legs each remain in the associated recess. In the deployed orientation, the legs each reside perpendicular with the plate for supporting the same in a horizontal plane when extended to its full rearward orientation. Each leg has a set screw 30 for maintaining a length thereof and a collapsing support for supporting large amounts of weight on the plate.

Figure 4:
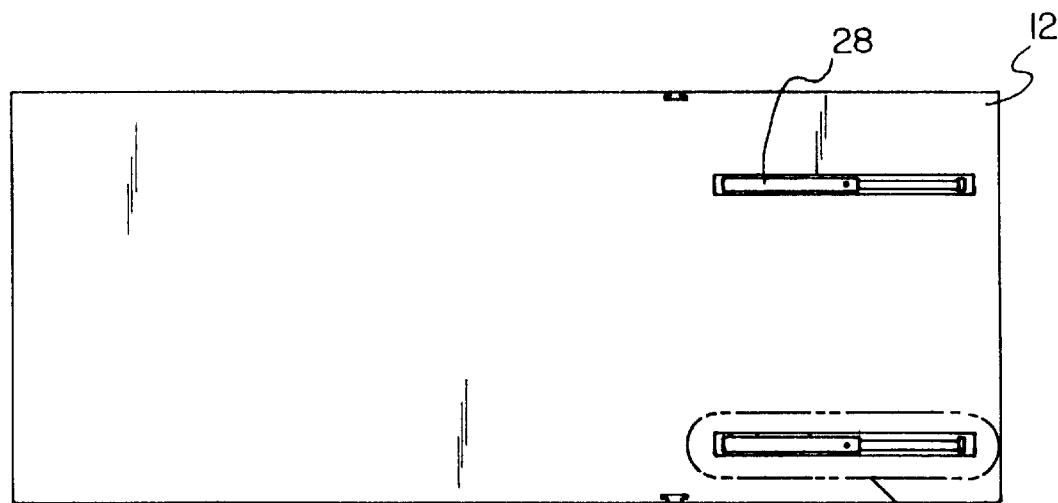
FIG. 4 is a bottom view of the plate of the present invention showing the legs in a retracted orientation.
Figure 5:
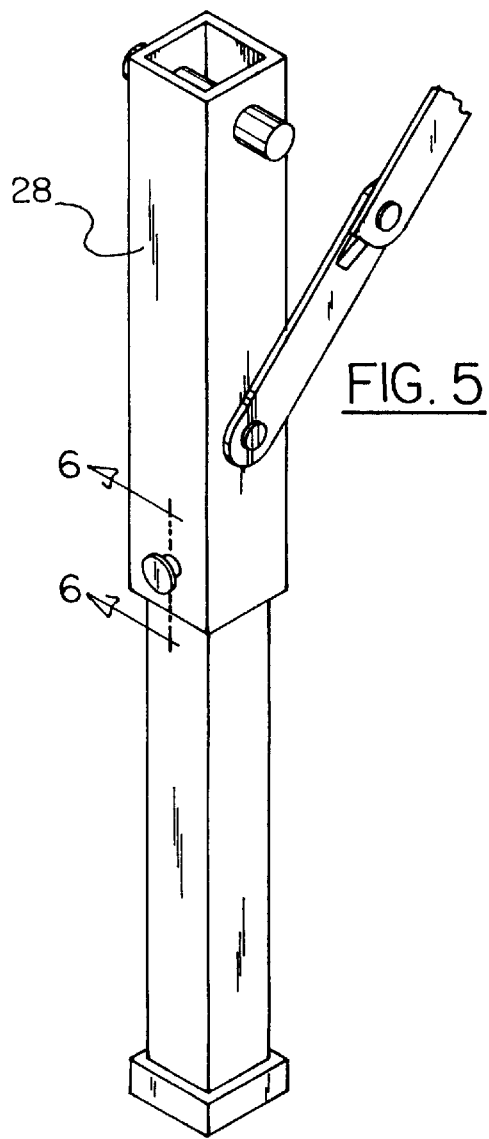
FIG. 5 is a perspective view of the present invention showing one of the legs thereof.
Figure 6:
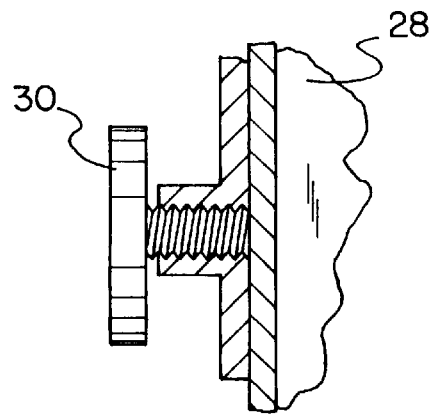
FIG. 6 is a side cross-sectional view of the present invention.
Figure 7:
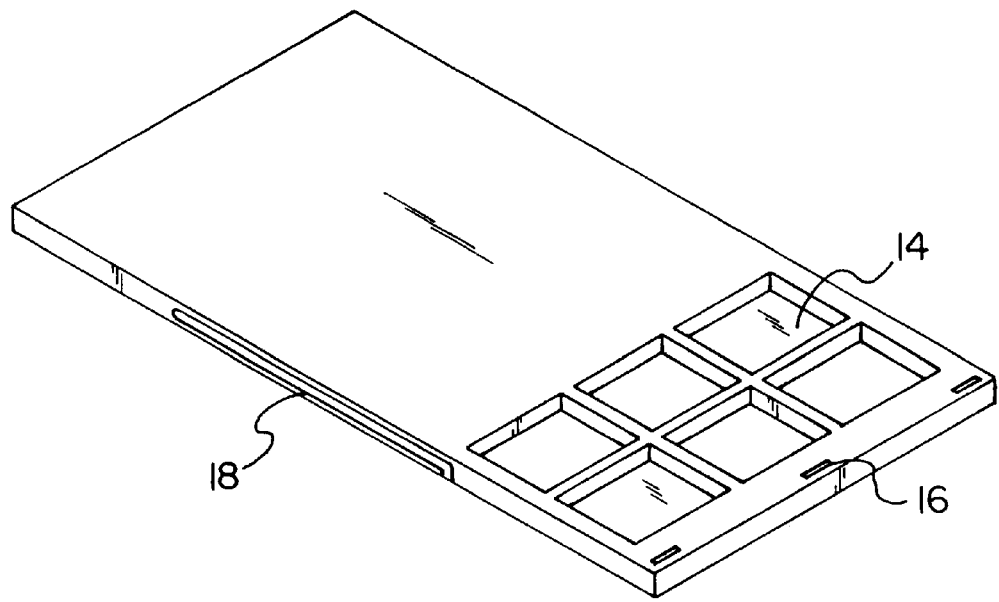
FIG. 7 is a top view of the plate of the present invention showing the recesses thereof.
Figure 8:
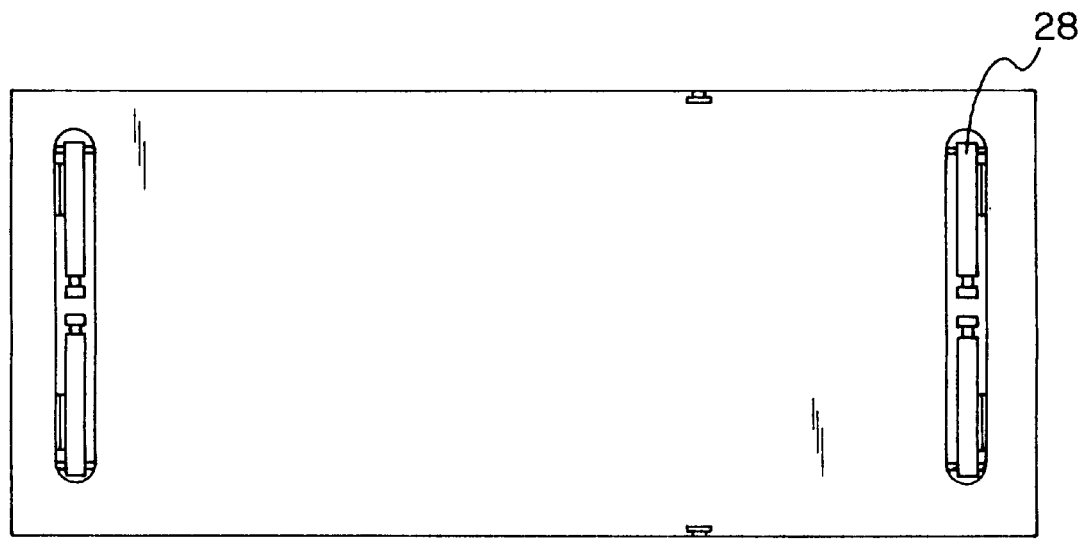
FIG. 8 is a bottom view of the plate showing an alternate configuration of the legs.
Figure 9:
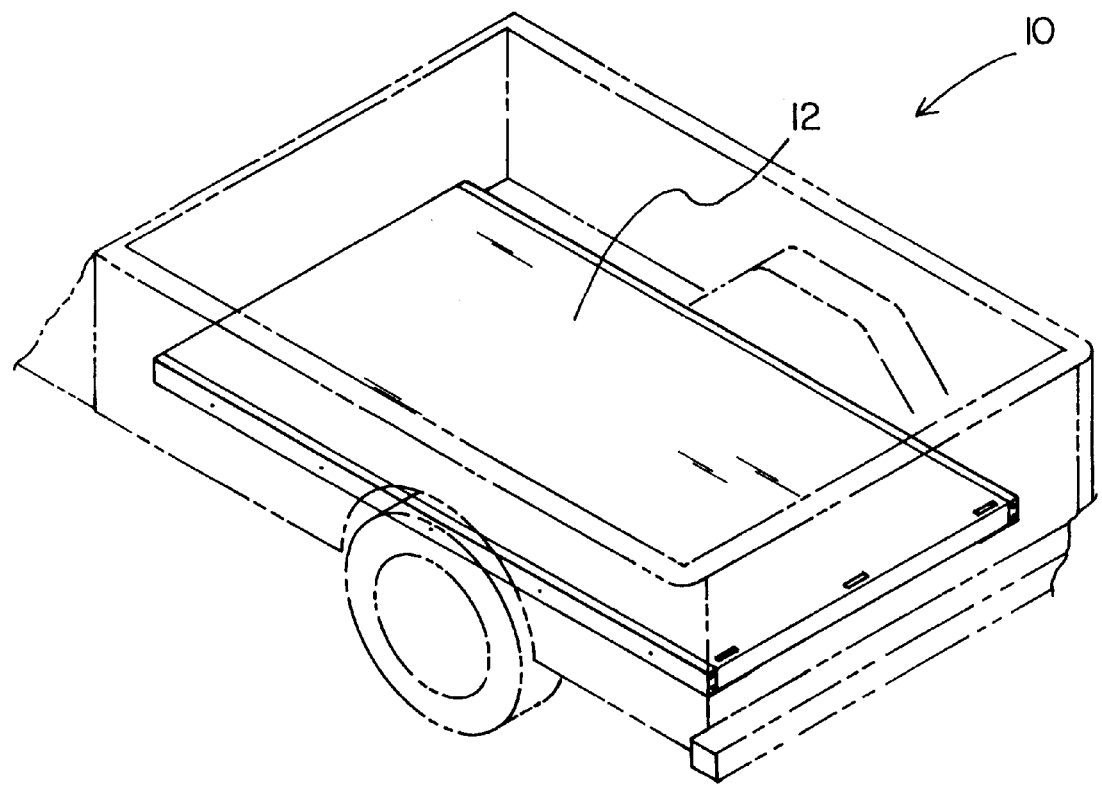
FIG. 9 is a perspective view of the present invention during use.
Figure 10:
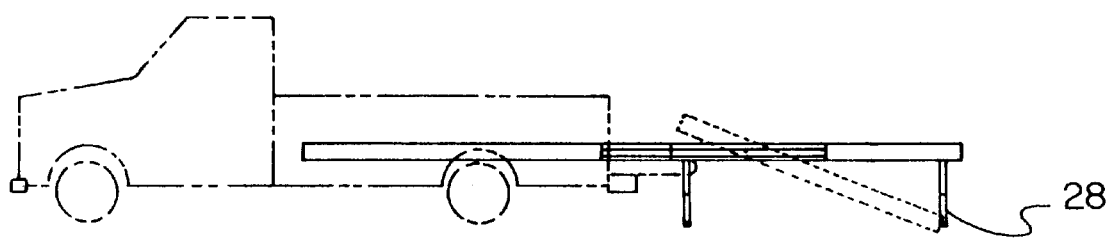
FIG. 10 is a side view of the present invention during use.

As shown in FIG. 4, a pair of legs may be situated adjacent to the rear one of the end faces of the plate and further pivot longitudinally with respect to the plate. In an alternate embodiment, as shown in FIG. 8, the legs may include an inboard end pivotally coupled adjacent to both the front and rear end faces of the plate. In such embodiment, the legs are adapted to pivot laterally with respect to the plate. It should be noted that the removable nature of the plate is critical such that the same may be utilized as a table. Further options associated with the present invention include a lockable storage box and detachable table/work bench.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A loader system comprising, in combination:

a plate having a planar rectangular configuration with a top face, a bottom face and a periphery formed therebetween defined by a pair of parallel elongated side faces and a pair of parallel short end faces, the top face having a matrix of rectangular recesses formed therein adjacent to a rear one of the end faces of the periphery for containing various items therein and a plurality of thin rectangular slits formed therein in linear alignment along the rear one of the end faces for gripping purposes, the side faces each having an elongated slot formed in a central extent thereof;

a pair of elongated brackets each having a length equal to that of a truck bed and an L-shaped cross-section along the entire length thereof, the brackets each including a horizontal extent coupled to a corresponding side edge of the truck bed and a vertical extent with a plurality of spaced rollers mounted along an inner surface thereof;

a pair of sleeves each having a length equal to that of the brackets and a rectangular cross-section along their entire length, each sleeve having an inner face, an outer face, a top face and a bottom face interconnected to define a pair of open ends, the inner face of each sleeve having a roller mounted to a central extent thereof, the outer face of each sleeve having an elongated slot formed along an entire length thereof for slidably receiving the rollers of an associated one of the brackets for sliding in constant parallel relationship therewith, whereby the roller of the inner face of each sleeve is slidably situated within the corresponding slot of the plate such that the plate may be slid forwards and rearwards in coplanar relationship with the truck bed and further pivoted about an axis defined by the rollers of the sleeves when extended to its full rearward orientation thereby affording a ramp; and a plurality of extendible legs mounted within recesses formed in the bottom face of the plate for pivoting between a retracted orientation within the associated recess and a deployed orientation perpendicular with the plate for supporting the same in a horizontal plane when extended to its full rearward orientation.

2. A loader system comprising:

a plate including a top face, a bottom face and a periphery formed therebetween defined by a pair of parallel side faces and a pair of parallel end faces, the side faces each having an elongated slot;

a pair of elongated brackets each including a horizontal extent coupled to a corresponding side edge of a truck bed and a vertical extent with a plurality of spaced rollers mounted along an inner surface thereof, and a pair of sleeves each having an inner face, an outer face, a top face and a bottom face interconnected to define a pair of open ends, the inner face of each sleeve having a roller, the outer face of each sleeve having an elongated slot formed along an entire length thereof for slidably receiving the rollers of an associated one of the brackets, wherein the roller of the inner face of each sleeve is slidably situated within the corresponding slot of the plate such that the plate may be slid forwards and rearwards and further pivoted about an axis defined by the rollers of the sleeves when extended to its full rearward orientation thereby affording a ramp.

3. A loader system as set forth in claim 2 wherein the plate has at least one leg mounted on a bottom face thereof for supporting the plate in a horizontal plane when extended rearward.

4. A loader system as set forth in claim 3 wherein the leg has a pair of telescoping portions.

5. A loader system as set forth in claim 3 wherein the leg is mounted adjacent to a rear edge of the plate.

6. A loader system as set forth in claim 3 wherein the leg is mounted adjacent to a front edge of the plate.

7. A loader system as set forth in claim 2 wherein at least one recess is formed in a top face of the plate for supporting cargo therein.

8. A loader system as set forth in claim 2 wherein at least one gripping slit is formed in the plate adjacent to a rear edge thereof.

9. A loader system as set forth in claim 2 wherein the roller of the inner face of each sleeve is removably situated within the corresponding slot of the plate through an open end such that the plate is removable for use as a table.

* * * * *